United States Patent
Zhou

(10) Patent No.: US 7,664,338 B2
(45) Date of Patent: Feb. 16, 2010

(54) PERSPECTIVE TRANSFORMATION OF TWO-DIMENSIONAL IMAGES

(75) Inventor: Mengyao Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 818 days.

(21) Appl. No.: 11/102,211

(22) Filed: Apr. 7, 2005

(65) Prior Publication Data

US 2006/0066731 A1   Mar. 30, 2006

Related U.S. Application Data

(60) Provisional application No. 60/614,216, filed on Sep. 28, 2004.

(51) Int. Cl.
*G06K 9/36* (2006.01)

(52) U.S. Cl. .................................. 382/276

(58) Field of Classification Search ............ 382/276, 382/193, 298, 299, 300
See application file for complete search history.

(56) References Cited

U.S. PATENT DOCUMENTS

| | | | | |
|---|---|---|---|---|
| 6,124,859 | A | 9/2000 | Horii et al. | 345/427 |
| 6,457,036 | B1 * | 9/2002 | Sloan | 708/650 |
| 2002/0113884 | A1 * | 8/2002 | Tanii et al. | 348/241 |
| 2002/0187831 | A1 | 12/2002 | Arikawa et al. | 463/32 |
| 2003/0002751 | A1 * | 1/2003 | Sun | 382/293 |

FOREIGN PATENT DOCUMENTS

EP   1406213   6/2002

OTHER PUBLICATIONS

Carlbom, et al., "Planar Geometric Projections and Viewing Transformations," Computing Surveys, vol. 10, No. 4, 465-502, Dec. 1978.
Max, "SIGGRAPH '84 Call for Omnimax Films," Computer Graphics, vol. 16. No. 4, 208-214, Dec. 1982.
The Boston Museum of Science. "Exploring Linear Perspective," http://www.mos.orgisln/Leonardo/ExploringLinearPerspective. html.
International Search Report - PCT/US05/035285, International Searching Authority - European Patent Office, Jan. 27, 2006.
Written Opinion - PCT/US05/035285, International Searching Authority - European Patent Office, Jan. 27, 2006.

(Continued)

*Primary Examiner*—Brian Q Le
(74) *Attorney, Agent, or Firm*—Timothy F. Loomis; Michael J. DeHaemer

(57) ABSTRACT

One aspect of the disclosure is directed to an embedded device. The embedded device comprises an image of interest selecting mechanism and a transformation mechanism. The transformation mechanism applies perspective transformation functions to the image of interest such that the image of interest varies from a greater width at a foreground viewpoint of the image of interest to a lesser width toward a vanishing point of the image of interest and such that the image of interest varies from a greater amount of expansion and lesser amount of compression at the foreground viewpoint of the image of interest to a lesser amount of expansion and a greater amount of compression towards the vanishing point of the image of interest.

35 Claims, 9 Drawing Sheets

OTHER PUBLICATIONS

Carlbom, et al.. "Planar Geometric Projections and Viewing Transformations," Computing Surveys, vol. 10, No. 4, 465-502, Dec. 1978.

Max, "SIGGRAPH '84 Call for Omnimax Films," Computer Graphics, vol. 16, No. 4, 208-214, Dec. 1982.

The Boston Museum of Science, "Exploring Linear Perspective," http://www.mos.org/sIn/Leonardo/ ExploringLinearPerspective.html.

International Search Report - PCT/US05/035285, International Searching Authority - European Patent Office, Jan. 27, 2006.

Written Opinion - PCT1US051035285, International Searching Authority - European Patent Office, Jan. 27, 2006.

Foley, et al., Computer Graphics: Principles and Practice, Second Edition in C. Boston, MA: Addison-Wesley, 1996, Sections 6.1, 6.1.1.

Lampton, Gardens of Imagination: Programming 3D Maze Games in C/C++. Corte Madera, CA: Waite Group Press, 1994, pp. 195-226.

Lengyel, Mathematics for 3D Game Programming & Computer Graphics, 2nd ed. Hingham, MA: Charles River Media, 2004, Section 6.4.

\* cited by examiner (b) PERSPECTIVE IMAGE FROM NEW ALGORITHM (a) ORIGINAL IMAGE (a)

(b)

(c)

(d)

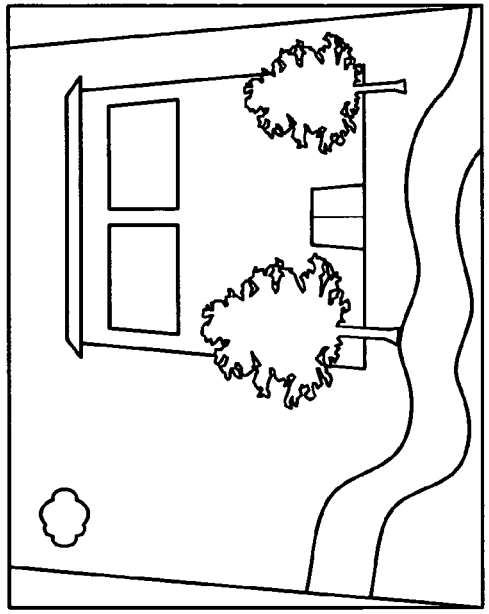
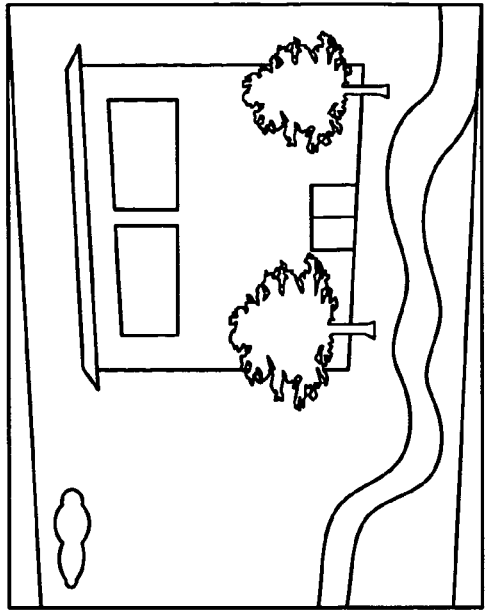
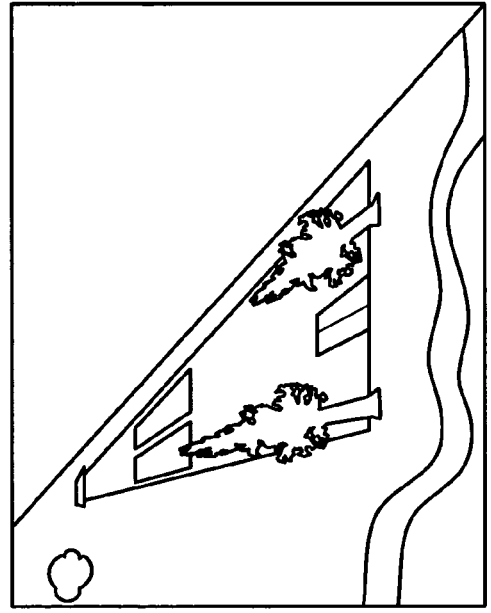
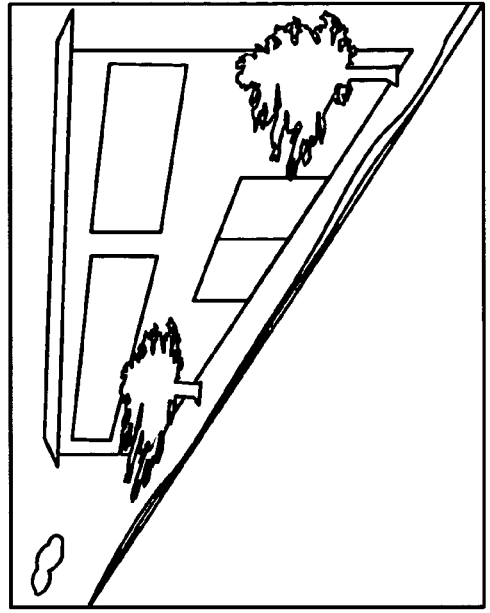
FIG. 9
FIG. 10

PERSPECTIVE TRANSFORMATION OF TWO-DIMENSIONAL IMAGES

CROSS REFERENCE TO RELATED APPLICATIONS

Priority is claimed to U.S. Provisional Application No. 60/614,216, filed Sep. 28, 2004.

COPYRIGHT NOTICE

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

STATEMENT REGARDING FEDERALLY SPONSORED RESEARCH OR DEVELOPMENT (Not Applicable)

BACKGROUND OF THE DISCLOSURE

Aspects of the disclosure relate to digital image manipulation. Other aspects relate to mobile telephones with image processing features.

Digital image manipulation describes many different types of modifications and transformations that may be performed on digital images. Examples of image manipulation operations include perspective transformation, rotation, magnification, pinching, warping, edge detection, and filtering.

The techniques of perspective foreshortening are used by artists to simulate the three-dimensional depth and distance of physical objects on a two-dimensional surface. For example, by painting or drawing nearer objects as larger and farther objects as smaller, and by carefully rendering the lines and angles of the objects, an artist can create an illusion of three-dimensionality in a two-dimensional space. In mathematical terms, a perspective view is a projection of a three-dimensional space onto a two-dimensional plane.

BRIEF SUMMARY OF THE DISCLOSURE

One aspect of the disclosure is directed to an embedded device. The embedded device comprises an image of interest selecting mechanism and a transformation mechanism. The transformation mechanism applies a perspective transformation function to the image of interest such that the image of interest varies from a greater width at a foreground viewpoint of the image of interest to a lesser width towards a vanishing point of the image of interest and such that the image of interest varies from a greater amount of expansion and lesser amount of compression at the foreground viewpoint of the image of interest to a lesser amount of expansion and a greater amount of compression towards the vanishing point of the image of interest.

BRIEF DESCRIPTION OF THE DRAWINGS

Embodiments will be described with reference to the following drawing figures, in which like numerals represent like items throughout the figures, and in which:

FIG. 3($b$) shows the image of FIG. 3($a$) as transformed by methods according to the illustrated embodiment using various parameters for the transformation;

FIG. 9 illustrates the image of FIG. 3($a$) as transformed by methods according to the illustrated embodiment using various parameters to generate different perspective views of the image with a vanishing point far from the camera; and FIG. 10 illustrates the image of FIG. 3($a$) as transformed by methods according to the illustrated embodiment using various parameters to generate different perspective views of the image with a vanishing point that is located off-center and close to the camera.

DETAILED DESCRIPTION

Figure 1:
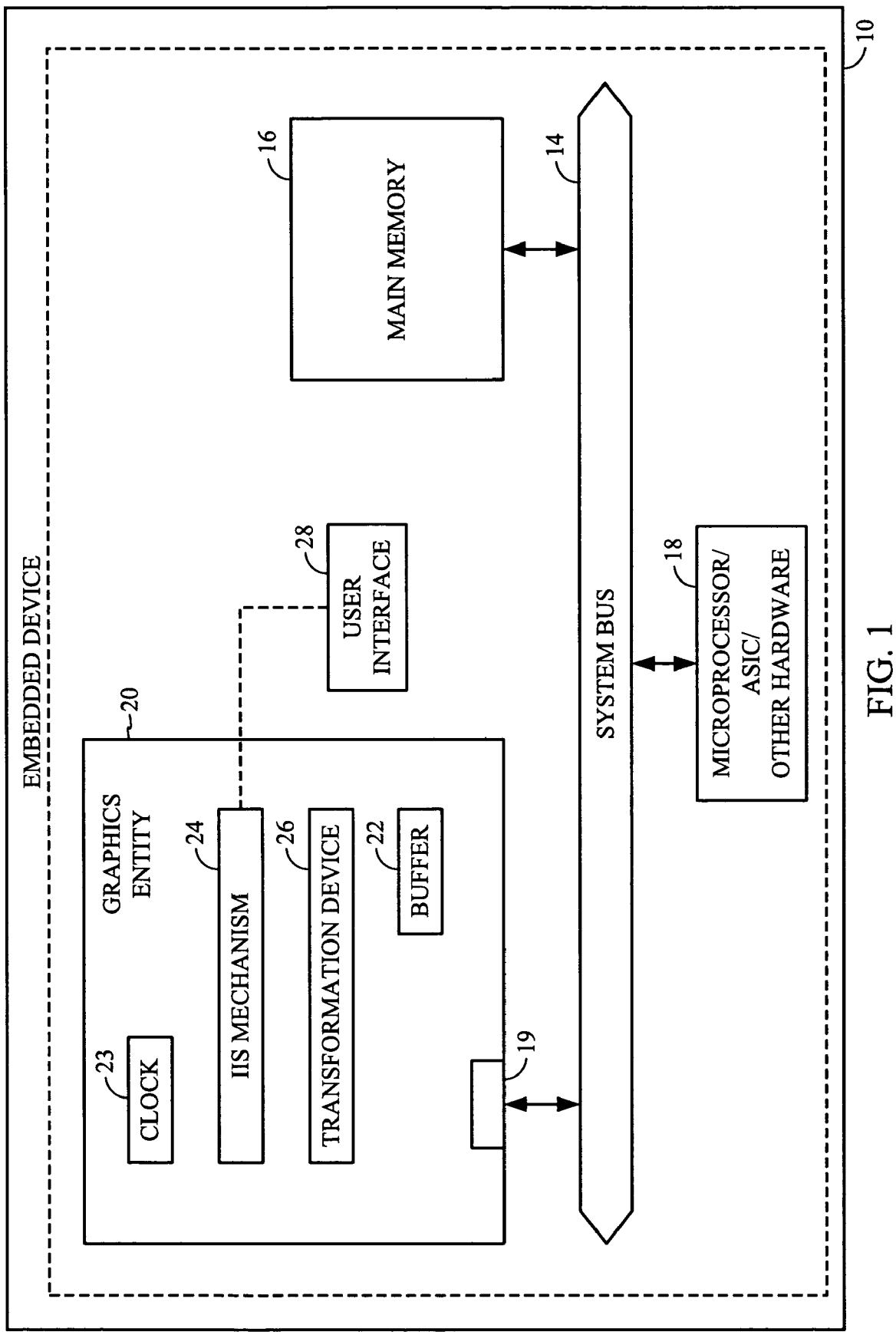
FIG. 1 is a block diagram of an exemplary embedded device capable of performing transformations on an image.

FIG. 1 is a block diagram of an exemplary embedded device 10, which, in the illustrated embodiment, comprises a wireless mobile communication device. The illustrated embedded device 10 comprises a system bus 14, a device memory 16 (which is a main memory in the illustrated device 10) connected to and accessible by other portions of the embedded device 10 through system bus 14, and hardware entities 18 connected to the system bus 14. At least some of the hardware entities 18 perform actions involving access to and use of main memory 16. The hardware entities 18 may include microprocessors, ASICs, and other hardware.

A graphics entity 20 is connected to the system bus 14. The graphics entity 20 may comprise a core or portion of a larger integrated system (e.g., a system on a chip (SoC)), or it may comprise a graphics chip, such as a graphics accelerator. In the illustrated embodiment, the graphics entity 20 comprises a graphics pipeline (not shown), a graphics clock 23, a buffer 22, and a bus interface 19 to interface graphics entity 20 with system bus 14.

Buffer 22 holds data used in per-pixel processing by graphics entity 20. Buffer 22 provides local storage of pixel-related data, such as pixel information from buffers (not shown) within main memory 16.

In the illustrated embodiment, graphics entity 20 is capable of performing perspective transformations of images. To that end, graphics entity 20 also includes an image of interest selecting mechanism 24 to display and allow a user to select an image to be transformed and a transformation device 26 to perform the image transformation. As shown, the image of interest selecting mechanism 24 is coupled to the user interface 28 of the embedded device 10. The image transformation that may be performed by embedded device 10 will be described in greater detail below. The image on which the embedded device 10 operates may be stored in the main memory 16 of the embedded device 10, the buffer 22 of the embedded device, or on a machine-readable medium interoperable with the embedded device. Additionally, although the graphics entity 20 performs the transformation functions in the illustrated embodiment, in other embodiments, those functions may be performed by the other hardware 18.

Figure 2:
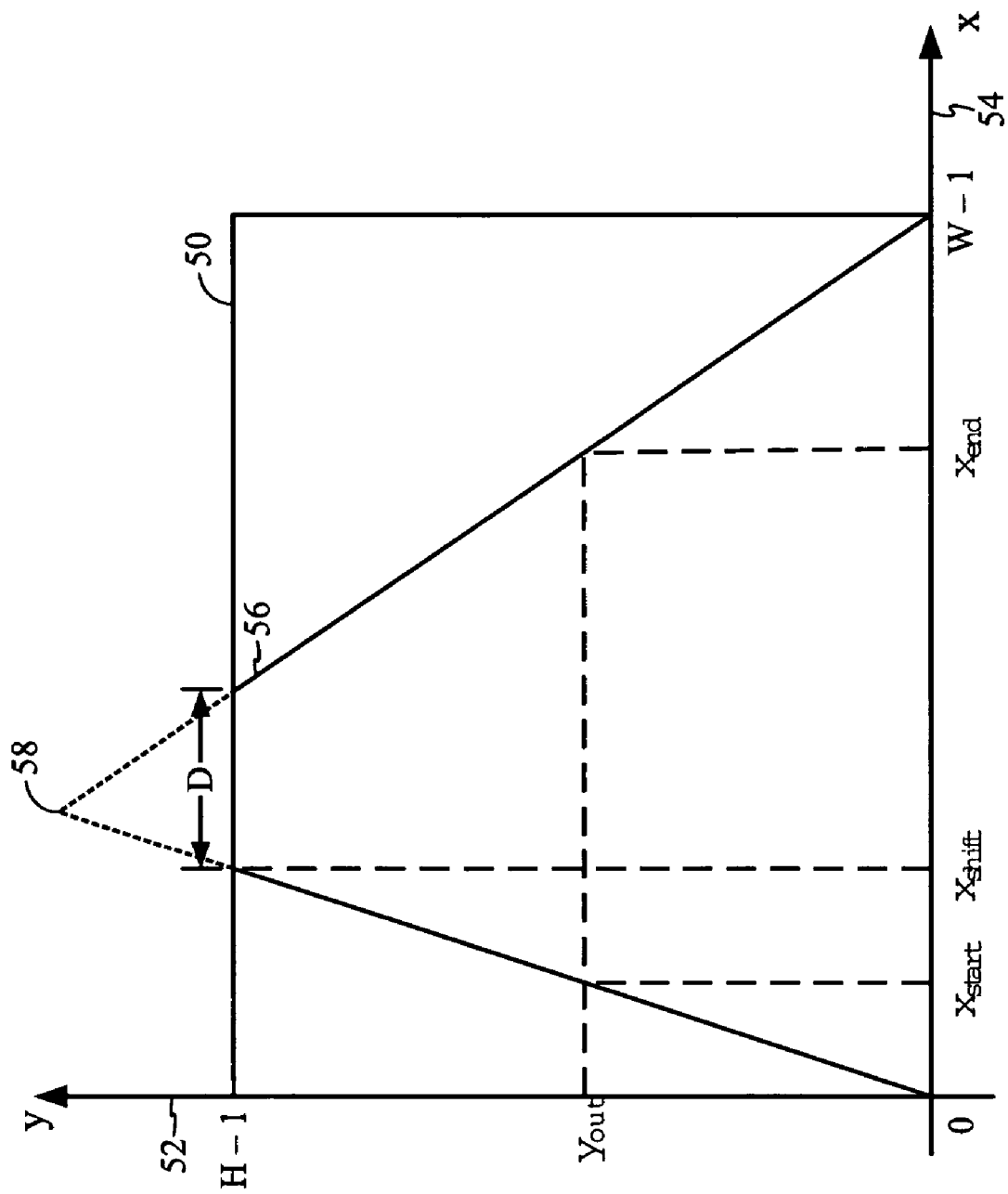
FIG. 2 is a schematic illustration of an image showing the characteristic of a mapping function for perspective transformation of the image.

FIG. 2 is a schematic illustration of an image 50. Image 50 is transformed by the illustrated transformation mechanism. The transformation mechanism applies a perspective transformation function to the image 50. The resulting one-point perspective image is generally indicated at 56. One-point perspective image 56 varies from a greater width at a foreground viewpoint of the image 50 to a lesser width towards a vanishing point 58 of the image 50. The term "vanishing point," as used herein, refers to the point where all parallel lines of the one-point perspective image 56 converge.

As illustrated in FIG. 2, image 50 has a width W and a height H. The width W and the height H are expressed in units of pixels, although other measurement units may be used. The height H of the image 50 extends along the y-axis 52 in FIG. 2, and the width W of the image extends along the x-axis 54. In FIG. 2, the width coordinates of the image 50 extend from 0 to W−1 and the height coordinates extend from 0 to H−1, as shown.

As illustrated in FIG. 2, one-point perspective image 56 has a top width of D, a height H, and a bottom width of W. The bottom width W, the height H, and the top width D are expressed in units of pixels, although other measurement units may be used.

Image 50 may originally be created in a number of ways, including digital photography, film photography followed by digitization, digitization from a non-photographic source, and pure digital illustration/rendering. Particular implementations of the image transformation methods presented here on specific types of images and specific platforms or computing systems will be described in greater detail below.

Most image transformations can be described as sets of mathematical transformation functions represented by sets of mathematical equations; these equations are descriptive of the operations being performed on the image regardless of the particular platform on which the transformations are implemented. The mathematical equations describing one example set of perspective transformation functions for the illustrated embodiment are given below as Equations (1) and (2). For each pixel in image 50:

$$x_{out} = \frac{W-1}{\Delta x} \cdot x_{in} + x_{start}, \quad (1)$$

$$y_{out} = y_{in} \cdot 2^{\left(\frac{H-1-y_{in}}{H-1}\right)k}, \text{ where} \quad (2)$$

$$x_{start} = \frac{x_{shift} \cdot y_{out}}{H-1}, \quad (3)$$

$$x_{end} = W - 1 - \frac{(W - D - x_{shift}) \cdot y_{out}}{H-1}, \quad (4)$$

$$\Delta x = x_{end} - x_{start}, \quad (5)$$

$$k = a \cdot \left(\frac{D}{W}\right) + b \cdot \left(\frac{D^2}{W^2}\right) + c \cdot \left(\frac{H}{y_{in} + \frac{H}{2}}\right) + d, \quad (6)$$

In Equations (1) through (6), $(x_{in}, y_{in})$ is the input pixel location, $(x_{out}, y_{out})$ is the output pixel location, and $x_{shift}$ is the x-coordinate of the left endpoint of the top width of the one-point perspective image 56. W is the width of image 50, which is also the bottom width of image 56. H is the height of both image 50 and image 56. D is the length of the smaller of the two parallel edges in image 56. Since the vanishing point is above the image, the smaller parallel edge is the top edge in this case. When the vanishing point is to the left, right, or bottom of the original image 50, the resulting perspective image 56 will taper towards the left, right, or bottom. In such cases, the smaller parallel edge will be on the left, right, or bottom of the image.

In Equation (6), the constants a, b, c, and d are empirically determined and can be used for any image of an arbitrary size. These constants determine the amount and smoothness of the perspective foreshortening effect in one-point perspective image 56. For instance, one set of possible values for (a, b, c, d) is (0.00402, −1.87736, 0.50697, 0.87585).

Equations (2) and (6) determine the amount of expansion and compression in the perspective image. The factor k in Equation (2) controls the variation and the amount of expansion and compression in the perspective image. The factor k depends on the distance between the camera (i.e. the viewpoint) and the vanishing point 58 as indicated by Equation (6). Thus, the factor k varies as a function of the height H, the top width D, and the bottom width W of the one-point perspective image 56. In application, the image of interest will vary from a greater amount of expansion and lesser amount of compression at a foreground viewpoint of the image of interest to a lesser amount of expansion and a greater amount of compression towards a vanishing point of the image of interest.

The width ratio (D/W) varies between 0 and 1 and depends on the location of the vanishing point. A small ratio indicates that the vanishing point is close to the camera. A large ratio indicates that the vanishing point is far from the camera. For example, a width ratio equal to one indicates a vanishing point at infinity.

The y-coordinate values represent the distance between the camera and points in the image. A small y-coordinate indicates a point close to the camera. Alternatively, a large y-coordinate represents a point far from the camera.

Figure 3:
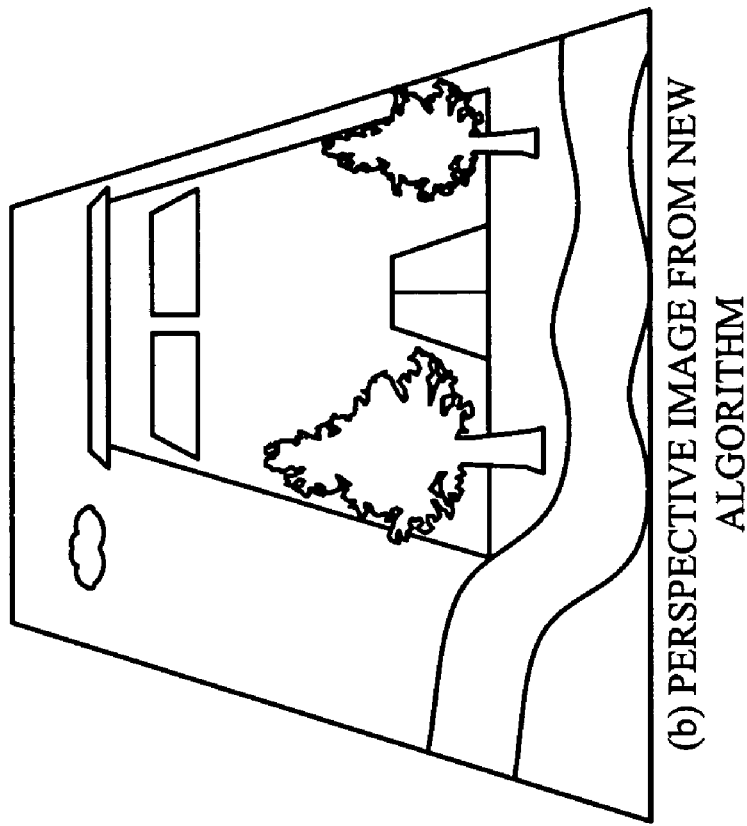
FIG. 3($a$) is an original size 520×390 pixel image before transformation using the illustrated method.
Figure 3:
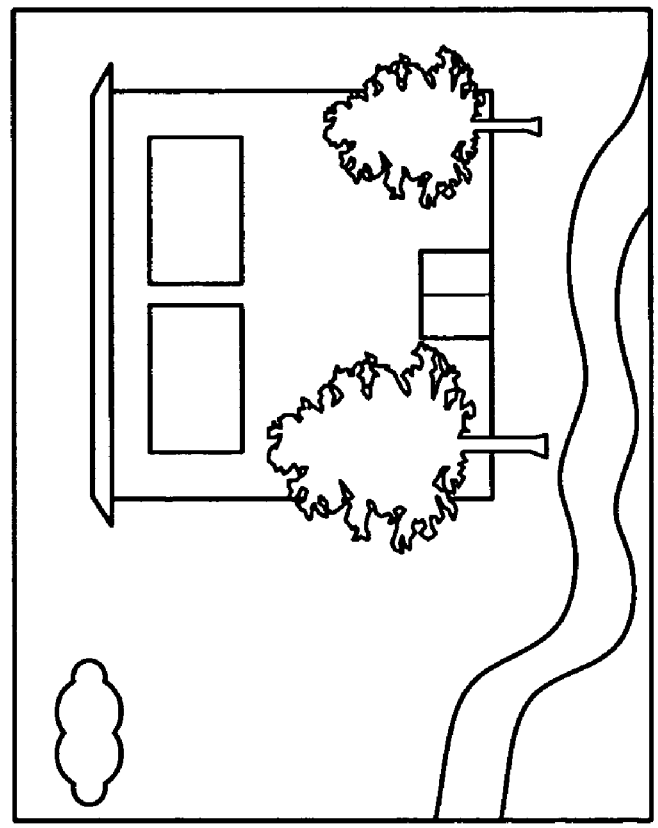

In application, a perspective transformation of a 520×390 pixel image using Equations (1) through (6) with a vanishing point at infinity, produces the image shown in FIG. 3(a), which is equivalent to the original image. Additionally, a perspective transformation of a 520×390 pixel image using Equations (1) through (6) with k=1, W=520 pixels, H=390 pixels, D=260 pixels, and $x_{shift}$=130 pixels produces the image shown in FIG. 3(b) where the bottom of the image is close to the camera and the top of the image is far from the camera.

As a specific example of the use of the equations above, taking the image of FIG. 3(b) as an example, when k=1, D=260 pixels, and $x_{shift}$=130 pixels, Equation (2) reduces to the following equation:

$$y_{out} = y_{in} \cdot 2^{\left(\frac{H-1-y_{in}}{H-1}\right)} \quad (7)$$

As illustrated in FIG. 3(b), the closer a region of the original image is to the camera the more expanded the region becomes in the perspective image. In order to obtain this perspective foreshortening effect, a 1-to-2 mapping of the y-coordinate values is desired. For example, when $y_{in}=1$ and the result is truncated to an integer, Equation (7) yields:

$$y_{out} = y_{in} \cdot 2^{\left(\frac{H-1-y_{in}}{H-1}\right)} = 1 \cdot 2^{\left(\frac{390-1-1}{390-1}\right)} \cong 1.$$

Similarly, for $y_{in}=2$, $$y_{out} = y_{in} \cdot 2^{\left(\frac{H-1-y_{in}}{H-1}\right)} = 2 \cdot 2^{\left(\frac{390-1-2}{390-1}\right)} \cong 3.$$

As illustrated by the results, there is a gap between the $y_{out}$ values for $y_{in}=1$ and $y_{in}=2$. This gap, in effect, means that no output pixel is produced at $y_{out}=2$, and thus, no output pixel exists in the initial output image at that location. However, the empty pixel location in the initial output image can be filled by pixel interpolation or duplication using the existing pixels to create a final output image with the desired 1-to-2 mapping of the $y_{in}$ pixel values.

As illustrated in FIG. 3(b), the farther a region of the original image is from the camera, the more compressed the region becomes in the perspective image. In order to obtain this perspective foreshortening effect, a 2-to-1 mapping between input and output pixels is desired. For example, when $y_{in}=H-3=387$ and the result is truncated to an integer, Equation (7) yields:

$$y_{out} = y_{in} \cdot 2^{\left(\frac{H-1-y_{in}}{H-1}\right)} = 387 \cdot 2^{\left(\frac{390-1-387}{390-1}\right)} \cong 388.$$

Similarly, for $y_{in}=H-2=388$, $$y_{out} = y_{in} \cdot 2^{\left(\frac{H-1-y_{in}}{H-1}\right)} = 388 \cdot 2^{\left(\frac{390-1-388}{390-1}\right)} \cong 388.$$

As illustrated by the results, there is no disparity between the $y_{out}$ values thus resulting in the desired 2 to 1 mapping. In other embodiments, where different degrees of perspective foreshortening are desired, the constants a, b, c, and d in Equation (6) may be adjusted to yield different values of k that will produce the desired perspective effects.

A transformation method may be implemented to run on a computing system of limited capabilities, such as an integer microprocessor. While some integer microprocessors include a floating-point (i.e. decimal) mathematics emulator, it can be more time consuming and computationally expensive to use the emulator. The transformations may be implemented using integer arithmetic.

When implementing transformation equations such as Equations (1) through (6) on an integer microprocessor, two considerations arise: the calculation of power functions in those equations using only integer arithmetic, and the ordering of operations as to avoid integer overflow (i.e., the condition in which a calculated number exceeds the largest integer that the microprocessor can handle).

Figure 4:
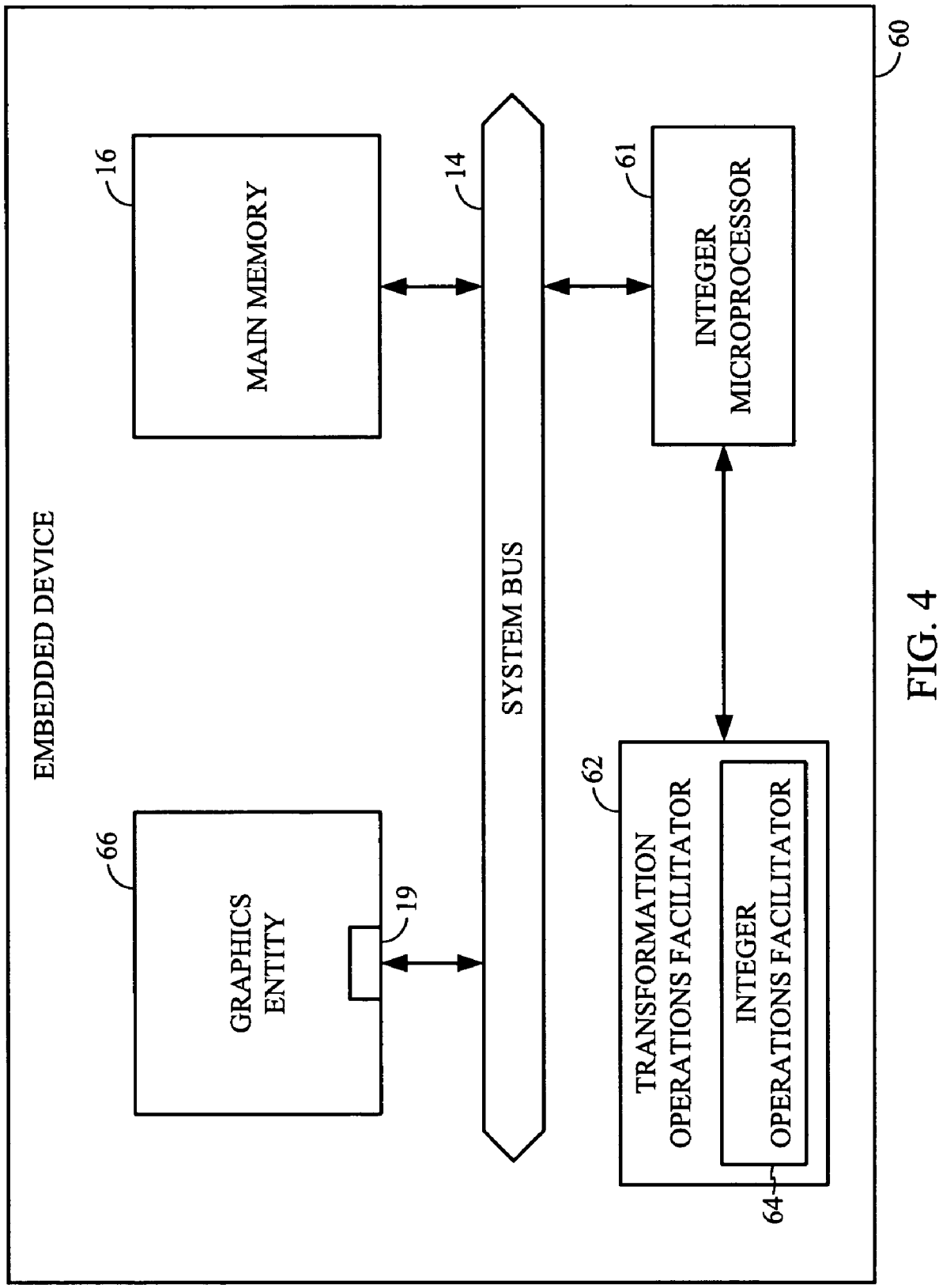
FIG. 4 is a block diagram of an exemplary embedded device with an integer microprocessor capable of performing transformations on images.

FIG. 4 is a block diagram of an exemplary embedded device 60 to perform the transformations described above using integer arithmetic. The embedded device 60 includes a main memory 16 connected to a system bus 14, a graphics entity 66 connected by an interface 19 to the system bus 14, and an integer microprocessor 61 connected to the system bus 14. Embedded device 60 also includes a transformation operations facilitator 62 connected to the microprocessor. An integer operations facilitator 64 is included within the transformation operations facilitator 62.

The transformation operations facilitator 62 calculates the power function in Equation (6) and performs the other transformation operations in a manner compatible with the microprocessor 61. The integer operations facilitator 64 ensures that all of the necessary calculations in Equations (1) through (6) are performed using integer arithmetic with an order of calculation that avoids integer overflow in the integer microprocessor 61. (The functions of both components 62, 64 and the calculations that are performed will be described below in more detail.) An advantage of an embedded device such as device 60 is that no floating-point emulator is used, which makes the transformations more efficient on the integer microprocessor 61. The transformation operations facilitator 62 and the integer operations facilitator 64 may be implemented in hardware, in software, in some combination of hardware and software, or in any other way compatible with the microprocessor 61.

In order to calculate the power function in Equation (6), in the illustrated embodiment, a Taylor series expansion of the function is used. For an arbitrary power function, the Taylor series expansion is given by Equation (8):

$$a^n = 1 + (\ln a)n + \frac{(\ln a)^2}{a!}n^2 + \frac{(\ln a)^3}{3!}n^3 + \cdots + \frac{(\ln a)^k}{k!}n^k + \cdots \quad (8)$$

As in any Taylor series, the approximation becomes more accurate as more terms are added. However, the more terms of a Taylor series that are used, the more computationally expensive the process becomes. Additionally, successive terms of a Taylor series add ever more diminishing amounts of accuracy to the final result. Therefore, the number of Taylor series terms that are used to calculate the power function will depend on the accuracy desired as well as the computing power available. In one implementation, which will be described below in greater detail, the first four terms of the Taylor series were found to provide sufficient accuracy without requiring undue computing power. Using the first four terms of the series with a=2, Equation (8) reduces to Equation (9):

$$2^n \cong 1 + (\ln 2)n + \frac{(\ln 2)^2}{2!}n^2 + \frac{(\ln 2)^2}{3!}n^3 \quad (9)$$

Although equation (9) does not contain strictly integer terms, the non-integer terms can be converted to integers for the purposes of performing the calculations. For example, the natural logarithm of 2 can be multiplied by $2^{10}$ (i.e. shifted 10 bits to the left) and rounded to the nearest integer to result in 710. Intermediate arithmetic operations may be calculated using this integer representation for the natural logarithm of 2. After all of the intermediate arithmetic operations have been calculated, the final result may be obtained by dividing by $2^{10}$ (i.e. shifting to the right by 10 bits). Typically, a large integer factor is used so that a number of significant digits are used and as much accuracy as possible can be preserved. However, smaller integer factors can be used if less accuracy is desired. Additionally, although any large factor can be used when converting floating-point numbers to integers, powers of two are used in the illustrated embodiment so that relatively slow multiplication operations can be replaced by relatively fast bit-shifting operations.

A sample of the implementation code for a 32-bit integer microprocessor using the four-term Taylor series approximation of Equation (9) and a $2^{16}$ integer conversion multiplier for the perspective operation is as follows:

int32 yin, yout, c1, c2, c3, a, k, k2;
    a=h−1;
    k2=((1054*(d<<8))/w+58777298)−(((1922*(d<<8)/w)<<8)/w*d);
    k=(k2+(int32)(1038*((a <<16)/((yin<<1)+a))))>>16;
    c1=((k*(−yin))>>1)/a;
    c2=(((c1*(a−yin))*k)/a)>>10;
    c3=((((c2*7*(a−yin))>>6)*k)/a)>>4;
    yout=(yin*(65536+89*c1+31*c2+c3))>>16;

In the above code snippet, 65536 is $1\times2^{16}$, and the operations are ordered so as to avoid integer overflow on the 32-bit microprocessor. The values of the Taylor series are stored in the intermediate variables c1, c2, and c3. A shifting operation at the end removes the effect of the $2^{16}$ multiplier.

The above code snippets were found to provide real-time results on a 32-bit integer microprocessor. Although this described embodiment is coded in C and implemented on a 32-bit microprocessor, other embodiments may be coded in any programming language, including C, C++, Java, and assembler, may be implemented on microprocessors of any capabilities, including 64-bit microprocessors and 128-bit microprocessors. The implementations need not use integer-only arithmetic and need not be ordered so as to avoid overflow. If these methods are implemented on an integer microprocessor, they may be provided as image processing functions on a mobile telephone with a digital camera or other portable electronic devices. It should also be understood that these methods may be implemented in software, hardware or any combination of software and hardware on a microprocessor, an ASIC, or any other platform with sufficient computing capability to implement them.

Figure 5:
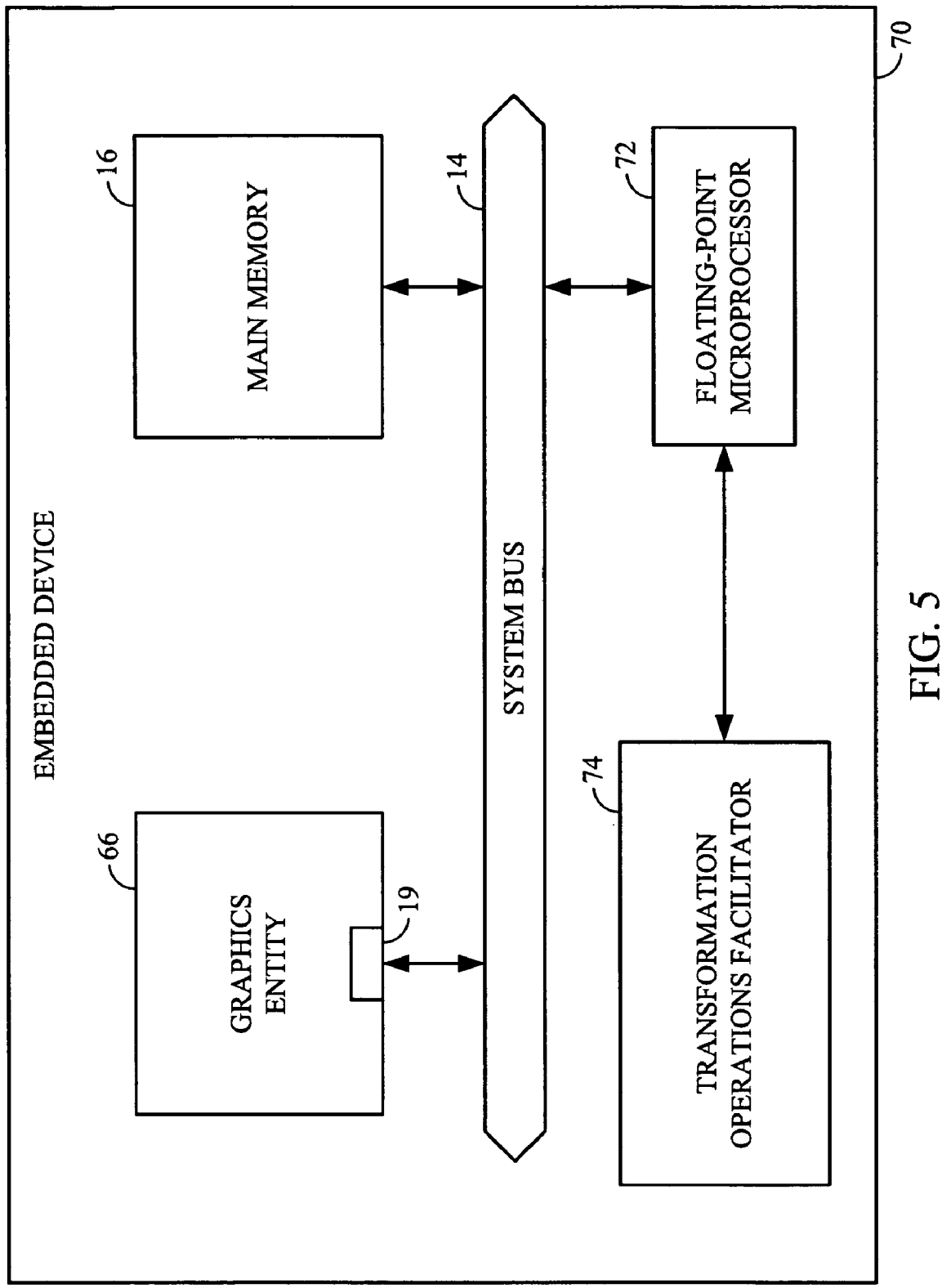
FIG. 5 is a block diagram of an exemplary embedded device with a floating-point microprocessor capable of performing transformations on image.

FIG. 5 is block diagram of an exemplary embedded device 70 that performs the transformations described above using floating-point arithmetic. The components of embedded device 70 are generally similar to those of embedded device 60, and thus, the description above will suffice with respect to the similar components. Unlike embedded device 60, embedded device 70 includes a floating-point microprocessor 72. Embedded device 70 also includes a transformation operations facilitator 74 coupled to the floating-point microprocessor 72, but the transformation operations facilitator 74 has no integer operations facilitator. Calculations are performed in embedded device 70 using floating-point numbers, omitting, for example, the tasks of converting the terms of Equations (1) through (6) into integers. Although an integer-only implementation of the illustrated transformation method would function correctly if performed on embedded device 70, it is advantageous to make use of the floating-point capabilities of microprocessor 72.

Figure 6:
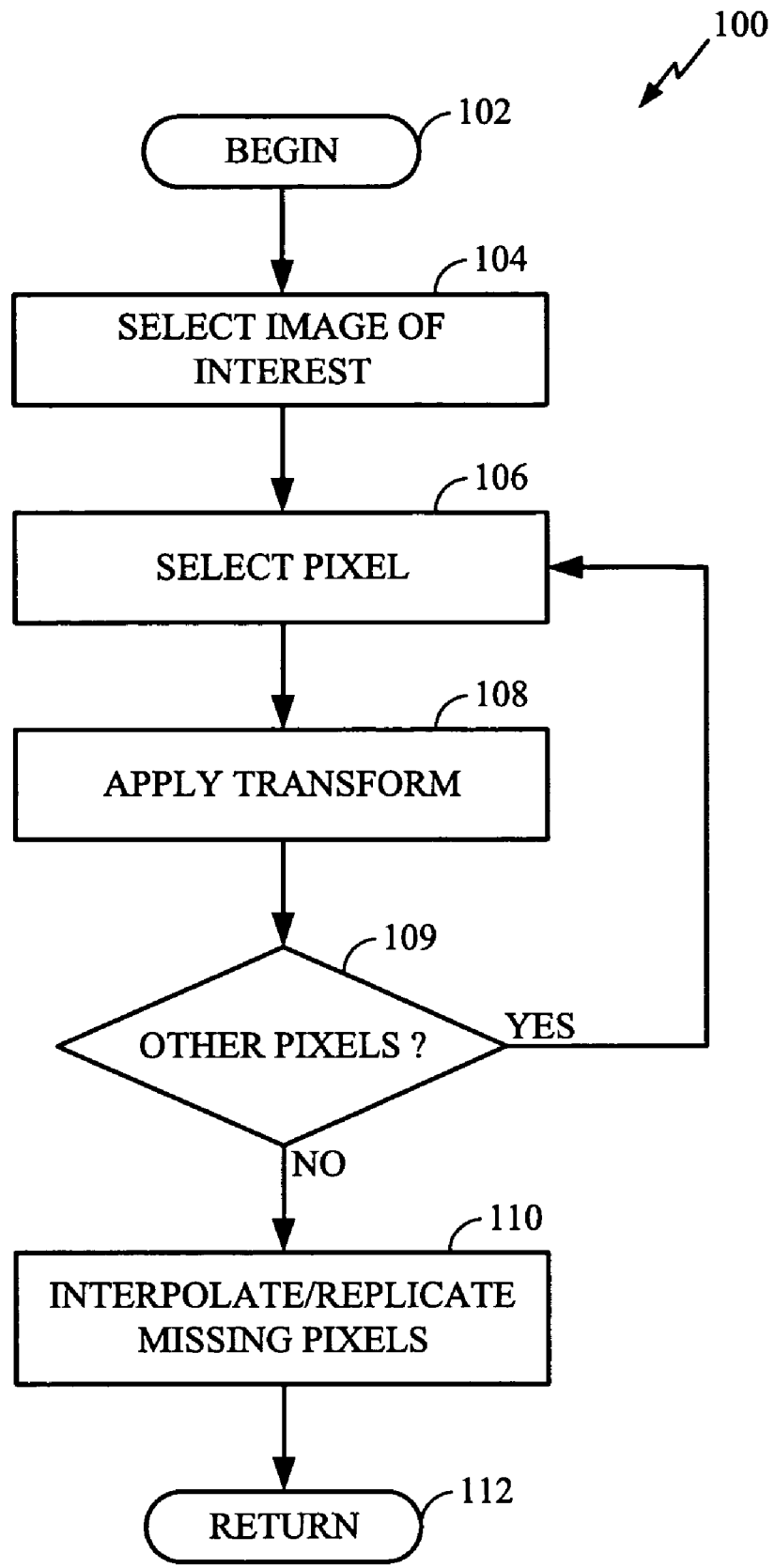
FIG. 6 is a schematic flow diagram illustrating the tasks involved in an implementation of the transformation methods.

FIG. 6 is a more general flow diagram illustrating a method 100 for applying a perspective transformation to an image. Method 100 may be implemented on any platform capable of performing the necessary calculations.

Method 100 begins at act 102 and control passes to act 104. In act 104, the user selects the input image of interest. Once the image of interest is selected, method 100 continues with act 106, in which a pixel of the input image is selected. Following act 106, method 100 continues with act 108. In act 108, the pixel is transformed by performing the operations described above and a resulting output pixel of an output image is generated. The control then passes to act 109, a decision task in which it is determined whether or not there are other pixels remaining in the input image. If there are other pixels remaining in the image (109: YES), control of method 100 returns to 106. If there are no other pixels remaining in the image (109: NO), control passes to 110. In act 110, any interpolation or replication of missing pixels in the output image necessary to create a complete perspective image may be performed. (In the simplest cases, any necessary pixel replication may be performed by nearest neighbor duplication.) Any other tasks required to create a whole, viewable image may also be performed at act 110, including the writing of header information for the output image file. Once act 110 is complete, method 100 terminates and returns at act 112.

In some of the foregoing description, it has been assumed that the image to be transformed is in the RGB (red-green-blue) format, in which each image pixel has a value for the red content of that pixel, a value for the green content, and a value for the blue content. However, the illustrated transformation method can be used directly on other image formats without first converting to RGB. This is advantageous because although RGB-format images are relatively easy to transform, they are more difficult to compress, and generally consume more storage space.

Two other common image formats are YCbCr and YCrCb. Whereas in an RGB image, data is stored in terms of the red, green, and blue color values for each pixel, the YCbCr and YCrCb formats store image data by recording the luminance (Y) and chrominance (Cb, Cr) values for each pixel. The YCbCr and YCrCb formats are popular because they are used in the common JPEG picture file format.

The ability to operate on RGB, YCbCr, and YCrCb images is advantageous if image transforms are implemented on a portable device such as a digital camera, because all three formats may be used in a digital camera. This is because of the way digital images are created and processed.

For example, most digital camera image sensors are composed of individual sensor cells that are sensitive to only one of red, green, or blue light, not to light of all three colors. Therefore, individual cells are typically deployed in a pattern, called a Bayer pattern, in which cells sensitive to green are dispersed among and alternated with cells sensitive to red and blue. In consumer products, green cells usually predominate because the human visual system is more sensitive to green, and the inclusion of more green cells tends to increase the perceived image quality. In one typical Bayer pattern, an array of 16 cells may include 8 green cells, 4 red cells, and 4 blue cells arranged roughly in a checkerboard pattern. When an image is taken by a digital device that uses single-color cells in a Bayer pattern, the raw image is typically interpolated such that each pixel has a red value, a green value, and a blue value and is stored, at least in an intermediate stage of processing, as an RGB image. The image may be further converted to YCbCr or YCrCb for compression and storage.

Although images in YCbCr and YCrCb formats may be directly processed by applying the transformation described above, there are some circumstances in which additional tasks may be performed, for example, with subsampled YCbCr and YCrCb images. In a subsampled image, some chrominance values are discarded or subsampled in order to reduce the size of the file. For example, in the common H2V1 YCbCr 4:2:2 format, pixel columns are subsampled, but pixel rows are unaffected. In this subsampling scheme, if the columns are numbered starting from zero, only even columns have the Cb component and only odd columns have the Cr component. Another subsampled format is the YCbCr 4:2:0 format, in which each 2×2 pixel array shares a single Cb value and a single Cr value. YCrCb format is generally the same as YCbCr, except that the order of Cb and Cr components is reversed.

The transformation methods described above may be directly applied to subsampled YCbCr and YCrCb formats, although doing so may not result in an end image with correctly alternating Cb and Cr components. To overcome this issue, a temporary unsubsampled image (YCbCr 4:4:4 or YCrCb 4:4:4) may be created from the subsampled image by considering pairs of adjacent pixels and duplicating the appropriate Cb and Cr values so that each pixel has a Cb and a Cr value. For storage purposes after transformation, the extra Cb and Cr values may be discarded. Tests performed by the inventor showed no visually perceptible differences between the processed result of an RGB image and the processed result of that same image in YCbCr and YCrCb formats.

Figure 7:
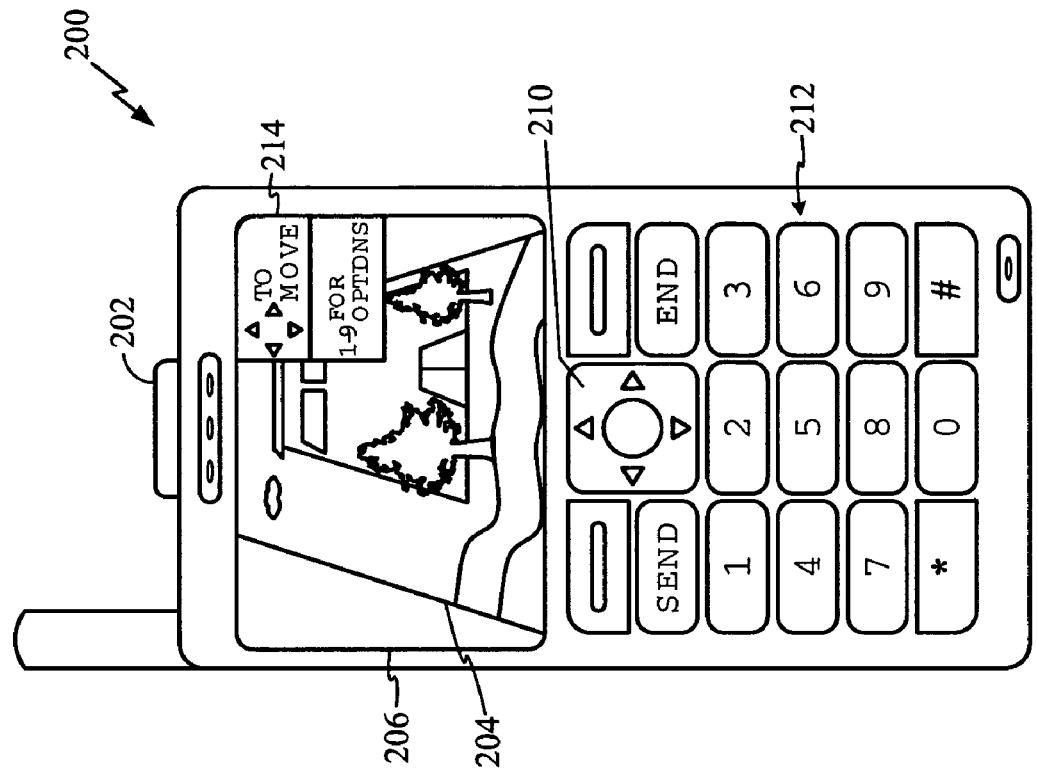
FIG. 7 is an illustration of a mobile telephone with a digital camera, illustrating the use of the transformation methods on a portable device.

FIG. 7 shows an embodiment of a mobile telephone 200 with a digital camera 202. The mobile telephone 200 and its digital camera 202 include the image of interest selecting mechanism 24 and the transformation device 26 of FIG. 1, or other mechanisms for performing an image transformation as described herein. In use, a user takes a digital picture using the digital camera 202 of the mobile telephone 200, and then uses the processing capabilities of the mobile telephone 200 to perform a transformation. As shown in FIG. 7, a digital image 204 is displayed on the display screen 206 of the mobile telephone 200. The display screen 206 may be a relatively small liquid crystal display driven by graphics entity 20; other types of display screens 206 may also be used. As shown, the image 204 has been prospectively transformed to one-point perspective. An overlay or pull-down menu 214 temporarily overlaid on the image 204 may provide instructions for changes in the magnitude and orientation of the perspective transformation. The user may be instructed to use some combination of number/letter keys 212 to change the perspective foreshortening effect, on the image 204. Depending on the implementation, the user may or may not be able to directly modify the values of the parameters of the transformation functions, described above; for example, the user may simply modify settings such as "perspective factor," the values for which are mapped to particular parameter values.

Depending on the implementation, the parameters of the transformation may be hard-coded or pre-set into the device, such that the transformation always results in, for example, perspective transformation with the same predetermined mapping values.

The following descriptions provide the results of several examples, illustrating a real time application of the perspective transformation of a stored image according to the above-described embodiment. Each illustrated case provides a perspective view of a transformed image using different combinations of width ratio, starting coordinate, and orientation.

Figure 8:
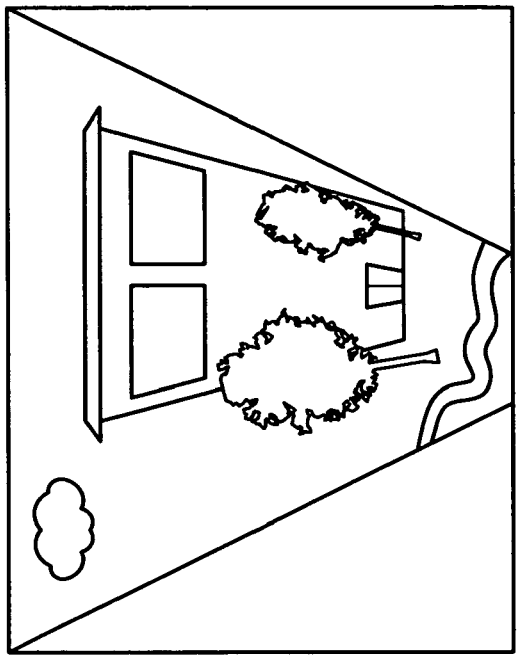
FIG. 8 illustrates the image of FIG. 3($a$) as transformed by methods according to the illustrated embodiments using various parameters to generate different perspective views of the image in four different orientations with a vanishing point close to the camera.
Figure 8:
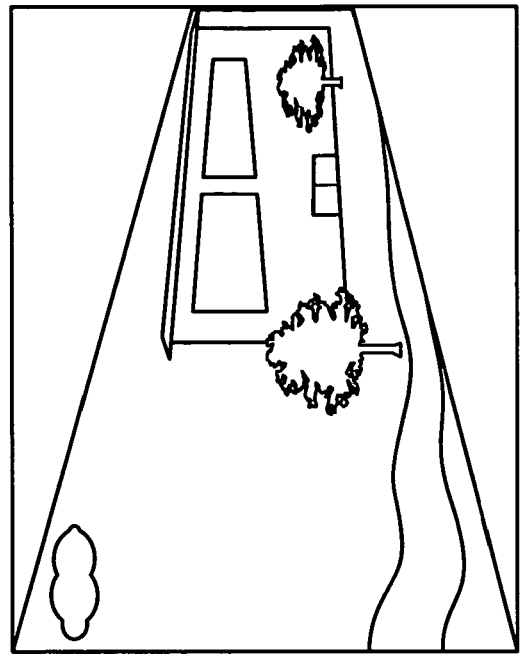
Figure 8:
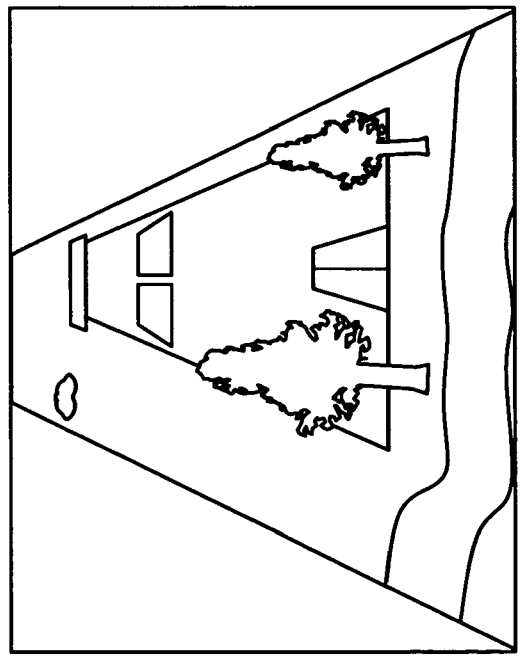
Figure 8:
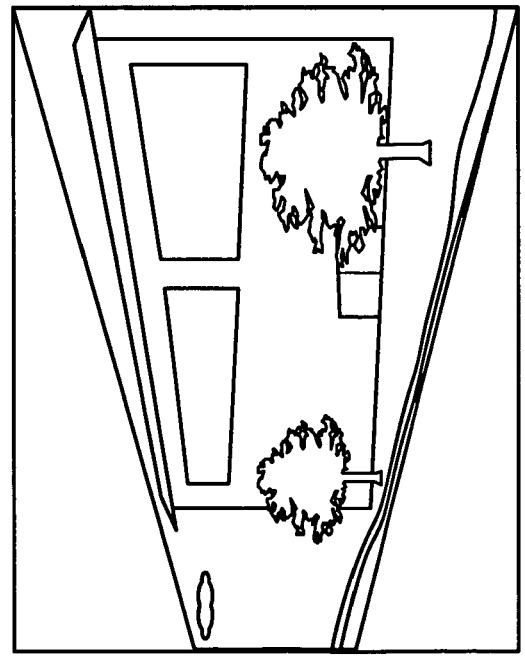

FIG. 8 illustrates the application of the perspective transformation methodology to a 520×390 image using four different combinations of width ratio, starting coordinate, and orientation. FIG. 8(a) illustrates an upwards-oriented perspective view of a processed 520×390 image with a vanishing point close to the viewpoint. Equations (1) through (6) are applied to the image with D=130, W=520, D/W=0.25, H=390, $x_{shift}$=195, and (a, b, c, d)=(0.00402, −1.87736, 0.50697, 0.87585), where all measurements are expressed in units of pixels.

FIG. 8(b) illustrates a downward-oriented perspective view of a processed 520×390 image with a vanishing point close to the viewpoint. Equations (1) through (6) are applied to the image with D=130, W=520, D/W=0.25, H=390, $x_{shift}$=195, and (a, b, c, d)=(0.00402, −1.87736, 0.50697, 0.87585), where all measurements are expressed in units of pixels.

FIG. 8(c) illustrates a leftward-oriented perspective view of a processed 520×390 image with a vanishing point close to the viewpoint. Equations (1) through (6) are applied to the image with D=130, W=390, D/W=0.333, H=520, $x_{shift}$=130, and (a, b, c, d)=(0.00402, −1.87736, 0.50697, 0.87585), where all measurements are expressed in units of pixels.

FIG. 8(d) illustrates a rightwards-oriented perspective view of a processed 520×390 image with a vanishing point close to the viewpoint. Equations (1) through (6) are applied to the image with D=130, W=390, D/W=0.333, H=520, $x_{shift}$=130, and (a, b, c, d)=(0.00402, −1.87736, 0.50697, 0.87585), where all measurements are expressed in units of pixels.

FIG. 9 illustrates the application of the perspective transformation methodology to a 520×390 image using two different combinations of width ratio, starting coordinate, and orientation. FIG. 9(a) illustrates an upward-oriented perspective view of a processed 520×390 image with a vanishing point far from the viewpoint. Equations (1) through (6) are applied to the image with D=450, W=520, D/W=0.865, H=390, $x_{shift}$=35, and (a, b, c, d)=(0.00402, −1.87736, 0.50697, 0.87585), where all measurements are expressed in units of pixels.

FIG. 9(b) illustrates a leftwards-oriented perspective view of a processed 520×390 image with vanishing point far from the viewpoint. Equations (1) through (6) are applied to the image with D=338, W=390, D/W=0.867, H=520, $x_{shift}$=26, and (a, b, c, d)=(0.00402, −1.87736, 0.50697, 0.87585), where all measurements are expressed in units of pixels.

FIG. 10 illustrates the application of the perspective transformation methodology to a 520×390 image using two different combinations of width ratio, starting coordinate, and orientation. FIG. 10(a) illustrates an upwards-oriented perspective view of a processed 520×390 image with a vanishing point that is off-center and close to the viewpoint. Equations (1) through (6) are applied to the image with D=65, W=520, D/W=0.125, H=390, $x_{shift}$=0, and (a, b, c, d)=(0.00402, −1.87736, 0.50697, 0.87585), where all measurements are expressed in units of pixels.

FIG. 10(b) illustrates a leftwards-oriented perspective view of a processed 520×390 image with a vanishing point that is off-center and close to the viewpoint. Equations (1) through (6) are applied to the image with D=65, W=390, D/W=0.167, H=520, $x_{shift}$=0, and (a, b, c, d)=(0.00402, −1.87736, 0.50697, 0.87585), where all measurements are expressed in units of pixels.

While certain illustrated embodiments are described, the words which have been used herein are words of description rather than words of limitation. Changes may be made, for example, within the purview of the appended claims.

What is claimed is:

1. An embedded device, comprising:
   microprocessor;
   an image of interest selecting mechanism; and
   a transformation mechanism to apply a perspective transformation function to the image of interest such that the image of interest varies from a greater width at a foreground viewpoint of the image of interest to a lesser width towards a vanishing point of the image of interest and such that the image of interest varies from a greater amount of expansion and lesser amount of compression at the foreground viewpoint of the image of interest to a lesser amount of expansion and a greater amount of compression towards the vanishing point of the image of interest, wherein the perspective transformation produces an output image having two parallel edges of length D and W, where D is the length of the smaller edge, the smaller edge starts at the x-coordinate $x_{start}$, and wherein the transformation mechanism executes Equations (1) and (2) below:

$$x_{out} = \frac{W-1}{\Delta x} \cdot x_{in} + x_{start}, \quad (1)$$

$$y_{out} = y_{in} \cdot 2^{\left(\frac{H-1-y_{in}}{H-1}\right)k}, \quad (2)$$

wherein k is a constant indicative of the amount and smoothness of expansion and compression in the perspective image, W is the width of the image of interest in pixels, H is the height of the image of interest in pixels, $x_{in}$ and $y_{in}$ are input pixel coordinates of the image of interest in pixels, and $x_{out}$ and $y_{out}$ are output pixel coordinates in pixels.

2. The embedded device of claim 1, further comprising a user interface to control the image of interest selecting mechanism.

3. The embedded device of claim 1, further comprising a graphics entity, wherein the image of interest selecting mechanism and the transformation mechanism are coupled to the graphics entity.

4. The embedded device of claim 3, further comprising:
a system bus;
a main memory; and
a display screen coupled to the graphics entity;
wherein the main memory and the graphics entity are coupled to the system bus.

5. The embedded device of claim 1, wherein the embedded device is a mobile telephone.

6. The embedded device of claim 5, wherein the mobile telephone includes a digital camera.

7. The embedded device of claim 1, wherein the perspective transformation mechanism includes an integer operations facilitator and an integer processor to perform the perspective transformation using only integer arithmetic.

8. The embedded device of claim 2, wherein the user interface includes options to allow a user to select parameters for the perspective transformation.

9. The embedded device of claim 7, wherein the integer operations facilitator includes a calculation ordering mechanism to order transformation calculations so as to avoid overflow.

10. The embedded device of claim 1, wherein the transformation mechanism performs a perspective transformation in real time.

11. The embedded device of claim 4, wherein the graphics entity includes a display mechanism to display a transformed image of interest on the display screen.

12. A computer-readable medium encoded with data, the encoded data interoperable with a microprocessor to cause:
selecting an image of interest; and
applying a perspective transformation to the image of interest such that the image of interest varies from a greater width at a foreground viewpoint of the image of interest to a lesser width towards a vanishing point of the image of interest and such that the image of interest varies from a greater amount of expansion and lesser amount of compression at the foreground viewpoint of the image of interest to a lesser amount of expansion and a greater amount of compression towards the vanishing point of the image of interest, wherein the encoded data is interoperable with a machine to cause the perspective transformation to produce an output image having two parallel edges of length D and W, where D is the length of the smaller edge, the smaller edge starts at the x-coordinate $x_{start}$, and wherein the encoded data causes the perspective transformation to be performed in accordance with Equations (1) and (2) below:

$$x_{out} = \frac{W-1}{\Delta x} \cdot x_{in} + x_{start}, \quad (1)$$

$$y_{out} = y_{in} \cdot 2^{\left(\frac{H-1-y_{in}}{H-1}\right)k}, \quad (2)$$

wherein k is a constant indicative of the amount and smoothness of expansion and compression in the perspective image, W is the width of the image of interest in pixels, H is the height of the image of interest in pixels, $x_{in}$ and $y_{in}$ are input pixel coordinates of the image of interest in pixels, and $x_{out}$ and $y_{out}$ are output pixel coordinates in pixels.

13. The computer-readable medium of claim 12, wherein the encoded data is interoperable with a microprocessor to cause the applying to be performed with only integer arithmetic.

14. The computer-readable medium of claim 13, wherein the encoded data is interoperable with a microprocessor to cause allowing a user to select parameters for the perspective transformation.

15. The computer-readable medium of claim 12, wherein the encoded data is interoperable with a microprocessor to cause the transformed image of interest to be the shape of a trapezoid.

16. The computer-readable medium of claim 12, wherein the encoded data is interoperable with a microprocessor to cause the transformation mechanism to perform calculations in a predetermined order of calculation so as to avoid overflow.

17. The computer-readable medium of claim 12, wherein the encoded data is interoperable with a microprocessor to cause the perspective transformation to be performed in real time.

18. The computer-readable medium of claim 12, wherein the encoded data is interoperable with a microprocessor to cause the perspective transformation to be performed in an embedded device.

19. The computer-readable medium of claim 12, wherein the encoded data is interoperable with a microprocessor to cause the perspective transformation to be performed in a mobile telephone.

20. The computer-readable medium of claim 19, wherein the mobile telephone includes a digital camera.

21. The computer-readable medium of claim 20, wherein the encoded data is interoperable with a microprocessor to cause the perspective transformation to be performed using an integer microprocessor.

22. Apparatus comprising:
means for selecting an image of interest; and
means for applying a perspective transformation to the image of interest such that the image of interest varies from a greater width at a foreground viewpoint of, the image of interest to a lesser width towards a vanishing point of the image of interests, wherein the perspective transformation produces an output image having two parallel edges of length D and W, where D is the length of the smaller edge, the smaller edge starts at the x-coordinate $x_{start}$, and wherein the perspective transformation is represented by Equations (1) and (2) below:

$$x_{out} = \frac{W-1}{\Delta x} \cdot x_{in} + x_{start}, \quad (1)$$

$$y_{out} = y_{in} \cdot 2^{\left(\frac{H-1-y_{in}}{H-1}\right)}, \quad (2)$$

wherein k constant indicative of the amount and smoothness of expansion and compression in the perspective image, W is the width of the image of interest in pixels, H is the height of the image of interest in pixels, $x_{in}$ and $y_{in}$ are input coordinates of the image of interest in pixels, and $x_{out}$ and $y_{out}$ are output pixel coordinates in pixels.

23. The apparatus of claim 22, wherein the applying means includes means for performing the perspective transformation using only integer arithmetic.

24. The apparatus of claim 23, wherein the transformed image of interest is the shape of a trapezoid.

25. The apparatus of claim 22, further comprising means for allowing a user to the select the image of interest.

26. A method of applying perspective transformation to an image comprising:
using a microprocessor to perform the following steps of:
selecting an image of interest; and
applying a perspective transformation to the image of interest such that the image of interest varies from a greater width at a foreground viewpoint of the image of interest to a lesser width towards a vanishing point of the image of interest and such that the image of interest varies from a greater amount of expansion and lesser amount of compression at the foreground viewpoint of the image of interest to a lesser amount of expansion and a greater amount of compression towards the vanishing point of the image of interest, wherein the perspective transformation to produce an output image having two parallel edges of length D and W, where D is the length of the smaller edge, the smaller edge starts at the x-coordinate $x_{start}$, and wherein the perspective transformation to be performed in accordance with Equations (1) and (2) below:

$$x_{out} = \frac{W-1}{\Delta x} \cdot x_{in} + x_{start}, \quad (1)$$

$$y_{out} = y_{in} \cdot 2^{\left(\frac{H-1-y_{in}}{H-1}\right)}, \quad (2)$$

wherein k is a constant indicative of the amount and smoothness of expansion and compression in the perspective image, W is the width of the image of interest in pixels, H is the height of the image of interest in pixels, $x_{in}$ and $y_{in}$ are input pixel coordinates of the image of interest in pixels, and $x_{out}$ and $y_{out}$ are output pixel coordinates in pixels.

27. The method of claim 26, wherein the applying step is to be performed with only integer arithmetic.

28. The method of claim 27, further comprising allowing a user to select parameters for the perspective transformation.

29. The method of claim 26, wherein the transformed image of interest to be the shape of a trapezoid.

30. The method of claim 26, wherein the perspective transformation performs calculations in a predetermined order of calculation so as to avoid overflow.

31. The method of claim 26, wherein the perspective transformation to be performed in real time.

32. The method of claim 26, wherein the perspective transformation is to be performed in an embedded device.

33. The method of claim 26, the perspective transformation is to be performed in a mobile telephone.

34. The method of claim 33, wherein the mobile telephone includes a digital camera.

35. The method of claim 34, wherein the perspective transformation is to be performed using an integer microprocessor.

* * * * *

UNITED STATES PATENT AND TRADEMARK OFFICE
CERTIFICATE OF CORRECTION

| | | |
|---|---|---|
| PATENT NO. | : 7,664,338 B2 | Page 1 of 1 |
| APPLICATION NO. | : 11/102211 | |
| DATED | : February 16, 2010 | |
| INVENTOR(S) | : Mengyao Zhou | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1097 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,664,338 B2
APPLICATION NO. : 11/102211
DATED : February 16, 2010
INVENTOR(S) : Zhou It is certified that error appears in the above-identified patent and that said Letters Patent is hereby corrected as shown below:

Column 11, line 54, claim 10: "a perspective transformation" to read as --the perspective transformation--

Column 12, line 29, claim 13: "a microprocessor" to read as --the microprocessor--

Column 12, line 33, claim 14: "a microprocessor" to read as --the microprocessor--

Column 12, line 37, claim 15: "a microprocessor" to read as --the microprocessor--

Column 12, line 41, claim 16: "a microprocessor" to read as --the microprocessor--

Column 12, line 46, claim 17: "a microprocessor" to read as --the microprocessor--

Column 12, line 50, claim 18: "a microprocessor" to read as --the microprocessor--

Column 12, line 54, claim 19: "a microprocessor" to read as --the microprocessor--

Column 12, line 60, claim 21: "a microprocessor" to read as --the microprocessor--

Column 12, line 67, claim 22: "viewpoint of," to read as --viewpoint of--

Column 13, line 2, claim 22: "image of interests," to read as --image of interest,--

Column 13, line 14, claim 22: " $y_{out} = y_{in} \cdot 2^{\left(\frac{H-1-y_{in}}{H-1}\right)}$, " to read as -- $y_{out} = y_{in} \cdot 2^{\left(\frac{H-1-y_{in}}{H-1}\right)k}$, --

Column 13, line 16, claim 22: "k constant" to read as --k is a constant--

Column 13, line 20, claim 22: "input coordinates" to read as --input pixel coordinates--

Signed and Sealed this
Twenty-first Day of June, 2011

David J. Kappos
*Director of the United States Patent and Trademark Office*

CERTIFICATE OF CORRECTION (continued)
U.S. Pat. No. 7,664,338 B2

Column 13, line 29, claim 25: "to the select" to read as --to select--

Column 14, line 13, claim 26: " $y_{out} = y_{in} \cdot 2^{\left(\frac{H-1-y_{in}}{H-1}\right)}$, " to read as -- $y_{out} = y_{in} \cdot 2^{\left(\frac{H-1-y_{in}}{H-1}\right)k}$, --

Column 14, line 28, claim 29: "interest to be" to read as --interest is to be--